J. P. CRANFORD.
Composition Pavement.
No. 6,511. Reissued June 29, 1875.
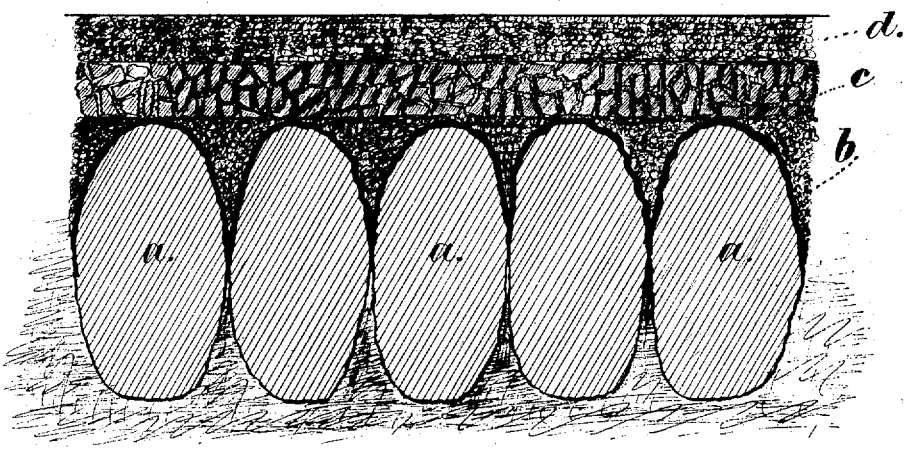
Witnesses,
Chas. H. Smith
Geo. T. Pinckney
Inventor
John P. Cranford
for Lemuel W. Serrell
atty

UNITED STATES PATENT OFFICE.

JOHN P. CRANFORD, OF BROOKLYN, NEW YORK, ASSIGNOR, BY MESNE ASSIGNMENTS, TO HIMSELF AND NATHAN B. ABBOTT.

IMPROVEMENT IN COMPOSITION PAVEMENTS.

Specification forming part of Letters Patent No. 88,139, dated March 23, 1869; reissue No. 6,511, dated June 29, 1875; application filed April 2, 1875.

*To all whom it may concern:*

Be it known that I, JOHN P. CRANFORD, of Brooklyn, in the county of Kings and State of New York, have invented and made a new and useful Improvement in Composition Pavements; and the following is hereby declared to be a full, clear, and exact description of the same.

In forming pavements of sand, gravel, broken stone, tar, and similar material, it is usual to remove the old pavement and excavate to the desired depth, and then form the roadway with layers of such materials, and roll them, for causing the mass to consolidate properly. In doing this considerable expense is involved in removing the old pavement, and in supplying sufficient thickness of composition pavement for the required strength.

The nature of my said invention consists in a method of preparing the foundation and laying the composition pavement so as to avail of the pavement already laid in the street, and put upon it a surface that makes a smooth roadway, and one that is water-proof, so that the frost will not injure the same.

Stone pavements are generally rough, uneven, and objectionable, especially for rapid driving, and with cobble-stones the roadway often contains ruts and deep depressions. These are to be repaired, and misplaced stones reset, and with some kinds of old stone pavements the inequalities can be lessened and the pavement consolidated by a heavy roller or by rammers.

The earth or dirt is removed and the upper surface of the pavement is cleaned by brushing or scraping, and when the exposed surface of the pavement is dry I apply tar, or similar bituminous material, in a melted or liquid state, by pouring the same upon the surface of the pavement, after which the inequalities of the pavement are filled up with a bituminous composition.

In the drawing annexed the improvement is illustrated by a vertical section, *a a*, representing cobble-stones as prepared in the aforesaid manner.

The bituminous composition is formed of sand, ashes, gravel, or similar material rendered plastic by the admixture of sufficient tar, or other bituminous material. This is rammed or otherwise forced into the interstices and inequalities of the pavement, and adheres to the previously-prepared surface. This layer is shown at *b*. A second layer, *c*, forms a body for the composition pavement. This is preferably of gravel or broken stone, mixed with sand, or gravel and ashes, or similar materials, rendered sufficiently plastic or adhesive, by tar or bituminous material, to cause the mass to consolidate firmly when exposed to a heavy pressure by rolling or otherwise. This also more fully consolidates the first layer *b*, and causes its adhesion to the old pavement. A top layer, *d*, is represented, and if composed of finer material than the layer *c*, such as gravel, sand, ashes, and tar, or bituminous material, it forms a somewhat elastic surface.

A pavement formed in the manner specified is very durable, and can be laid at much less cost than those before constructed of stone, gravel, &c., and bituminous material, because it does not require to be so thick. Water being excluded from the old foundation pavement there can be no injury from frost.

What I claim, and desire to secure by Letters Patent, is—

1. The method herein described of surfacing old pavement, by cleaning the surface of such pavement, applying a bituminous composition, and subjecting the same to heavy pressure, substantially as set forth.

2. The method herein described of surfacing old pavement by cleaning the surface of such pavement, coating the same with liquid bitumen, applying a bituminous composition, and subjecting the same to a heavy pressure, substantially as specified.

Signed by me this 26th day of March, A. D. 1875.

J. P. CRANFORD.

Witnesses:
GEO. T. PINCKNEY,
CHAS. H. SMITH.